(12) United States Patent
Mitani et al.

(10) Patent No.: US 11,987,191 B2
(45) Date of Patent: May 21, 2024

(54) BACK-UP POWER SUPPLY SYSTEM AND MOBILE BODY

(71) Applicant: Panasonic Intellectual Property Management Co., Ltd., Osaka (JP)

(72) Inventors: Yohsuke Mitani, Osaka (JP); Masatoshi Nakase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/998,651

(22) PCT Filed: May 18, 2021

(86) PCT No.: PCT/JP2021/018828
§ 371 (c)(1),
(2) Date: Nov. 11, 2022

(87) PCT Pub. No.: WO2021/235444
PCT Pub. Date: Nov. 25, 2021

(65) Prior Publication Data
US 2023/0192017 A1    Jun. 22, 2023

(30) Foreign Application Priority Data

May 20, 2020    (JP) .................................. 2020-088404

(51) Int. Cl.
*H02J 7/34*         (2006.01)
*B60R 16/033*    (2006.01)
*H02J 9/00*         (2006.01)

(52) U.S. Cl.
CPC ............ *B60R 16/033* (2013.01); *H02J 7/345* (2013.01); *H02J 9/002* (2013.01); *H02J 2207/20* (2020.01)

(58) Field of Classification Search
CPC ......... B60R 16/033; H02J 7/345; H02J 9/002; H02J 2207/20
See application file for complete search history.

(56) References Cited

U.S. PATENT DOCUMENTS

| 2014/0081520 A1* | 3/2014 | Sugimoto ............... H02J 9/061 701/36 |
| 2016/0079751 A1* | 3/2016 | Ide .......................... B60L 58/20 307/52 |

(Continued)

FOREIGN PATENT DOCUMENTS

| JP | 2011-030363 | 2/2011 |
| JP | 2017-165249 | 9/2017 |

(Continued)

OTHER PUBLICATIONS

International Search Report of PCT application No. PCT/JP2021/018828 dated Jul. 6, 2021.

*Primary Examiner* — Lincoln D Donovan
*Assistant Examiner* — Alex W Lam
(74) *Attorney, Agent, or Firm* — Rimon P.C.

(57) ABSTRACT

A back-up power supply system (1) is configured to supply electric power from an electric storage device (5) to loads (3) when a power supply (2) is defective. The back-up power supply system (1) includes a first voltage conversion circuit (6) configured to convert an output voltage of the electric storage device (5). The loads (3) include a first load (31) and a second load (32). The back-up power supply system (1) is configured to supply power from the electric storage device (5) to the first load (31) not via the voltage conversion circuit (6), and to supply electric power from the electric storage device (5) to the second load (32) via the voltage conversion circuit (6).

14 Claims, 4 Drawing Sheets

(56) References Cited

U.S. PATENT DOCUMENTS

| | | |
|---|---|---|
| 2016/0257270 A1* | 9/2016 | Teramoto ................ B60L 58/20 |
| 2019/0036374 A1 | 1/2019 | Hida |
| 2019/0103758 A1 | 4/2019 | Fukae |
| 2020/0070661 A1 | 3/2020 | Akuzawa |
| 2021/0229610 A1 | 7/2021 | Shimamoto et al. |

FOREIGN PATENT DOCUMENTS

| | | |
|---|---|---|
| JP | 2018-042334 | 3/2018 |
| JP | 2019-193493 | 10/2019 |
| JP | 2020-005481 | 1/2020 |
| JP | 2020-036465 | 3/2020 |

* cited by examiner

BACK-UP POWER SUPPLY SYSTEM AND MOBILE BODY

TECHNICAL FIELD

The present disclosure relates to a back-up power supply system and a movable body. More particularly, the present disclosure relates to a back-up power supply system configured to supply electric power to plural loads when a power supply is defective, and to a movable body equipped with the back-up power supply system.

BACKGROUND ART

A boost power supply circuit (voltage conversion circuit) disclosed in PTL 1 supplies electric power from a lithium ion battery (electric storage device). The boost power supply circuit boosts a direct current voltage of the lithium ion battery and supplies and the boosted voltage to various types of loads.

CITATION LIST

Patent Literature

PTL 1: Japanese Patent Laid-Open Publication No. 2020-5481

SUMMARY

The above-described boost power supply circuit boosts the output voltage of the lithium ion battery collectively and outputs it to the loads. Therefore, the power supply circuit necessarily boosts and outputs the output voltage collectively according to a load of the various loads that has the highest minimum guaranteed voltage. This configuration increases the voltage and current processed inside the boost power supply circuit, resulting in a drawback that the boost power supply circuit has a large size and a high cost.

In view of such circumstances as described above, an object of the present disclosure is to provide a back-up power supply system and a movable body that reduce the cost of the voltage conversion circuit converting the output voltage of an electric storage device.

A back-up power supply system according to an embodiment of the present disclosure is configured to supply electric power from an electric storage device to plural loads when a power supply is defective. The back-up power supply system includes a voltage conversion circuit configured to convert an output voltage of the electric storage device. The plural loads include a first load and a second load. The back-up power supply system is configured to supply electric power from the electric storage device to the first load not via the voltage conversion circuit. The back-up power supply system is configured to supply electric power from the electric storage device to the second load via the voltage conversion circuit.

A movable body according to the embodiment of the present disclosure includes the back-up power supply system and a movable-body main unit.

The present disclosure provides an advantage to reduce the cost of the voltage conversion circuit that converts the output voltage of the electric storage device.

DESCRIPTION OF EMBODIMENT

1. Exemplary Embodiment

1-1. Outline

Back-up power supply system 1 according to an exemplary embodiment will be described below with reference to the drawings. The structure described in the present exemplary embodiment is merely one embodiment of the present disclosure. The present disclosure is not limited to the present exemplary embodiment, but may be modified in various ways as far as such modifications do not depart from the scope of the technical ideas according to the present disclosure.

Figure 1:
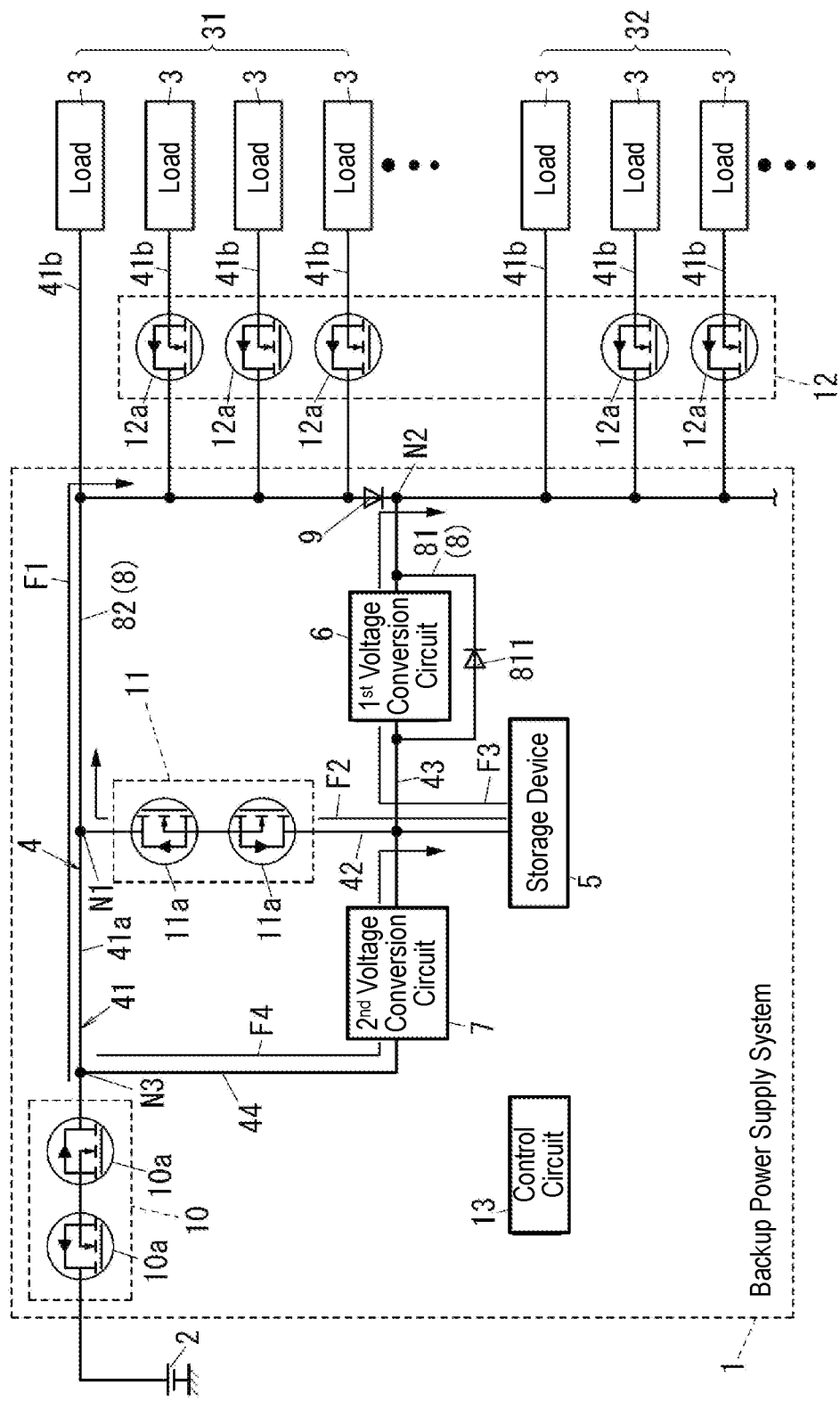
FIG. 1 is a block diagram of a back-up power supply system in accordance with an exemplary embodiment.
Figure 2:
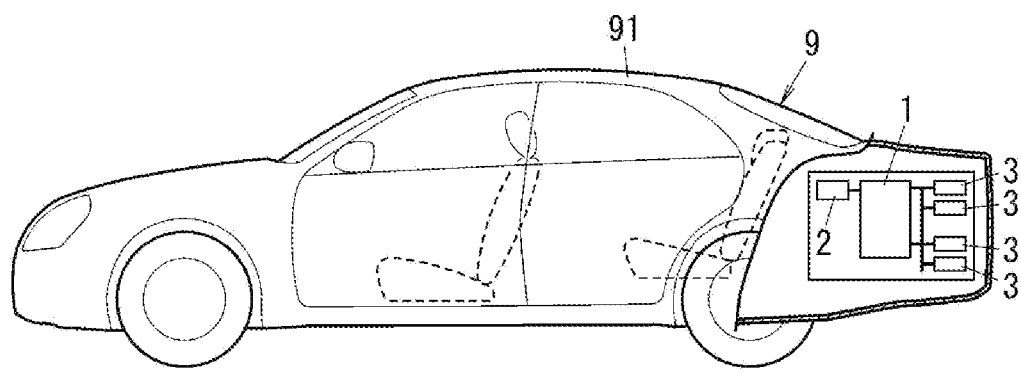
FIG. 2 is a side view, partially in section, of a vehicle including the back-up power supply system.

As illustrated in FIG. 1, back-up power supply system 1 is configured to be mounted on, for example, vehicle 9 (see FIG. 2), and supply electric power from electric storage device 5 to plural loads 3 when power supply 2 (such as a battery) is defective. This configuration allows loads 3 to continuously operate due to the supply of electric power from electric storage device 5 even when power supply 2 is defective. The phrase "power supply 2 is defective" means that supply of electric power stops from power supply 2 to loads 3 due to defects, deterioration, or disconnection of power supply 2.

Back-up power supply system 1 is thus configured to be mounted on vehicle 9 including power supply 2 and plural loads 3. Specifically, vehicle 9 (movable body) includes vehicle movable body 91 (movable-body main unit), power supply 2, plural loads 3, and back-up power supply system 1. While the present embodiment illustrates an example of back-up power supply system 1 mounted on vehicle 9, back-up power supply system 1 may be mounted on a movable body other than vehicle 9 (such as an airplane, ship, or train).

Plural Loads 3 include first loads 31 and second loads 32.

First load 31 includes plural loads 3 that satisfy a condition (first condition) in which first load 31 has higher power consumption (i.e., higher operating current) than second load 32 and a condition (second condition) in which first load 31 has a lower minimum guaranteed operating voltage than second load 32. The operating current refers to electric current for operating loads 3. The minimum guaranteed operating voltage refers to a voltage that guarantees operation of loads 3. That is, first load 31 includes a load that requires a high operating current but may permit a somewhat low operating voltage (i.e., that permits a decrease in operating voltage to a certain degree). Specifically, first load 31 includes loads 3 of power system (e.g., a brake system of vehicle 9 and an electric power steering system of vehicle 9).

Second load 32 includes plural loads 3 satisfying a condition of lower power consumption (i.e., lower operating current) than first load 31 and a condition of higher minimum guaranteed operating voltage than first load 31. That is, second load 32 includes a load that has a lower operating current but requires a somewhat higher operating voltage (i.e., that does not permit a decrease of operating voltage). Specifically, second load 32 includes loads 3 of control systems (e.g., an electronic control unit (ECU) of the brake system, an ECU of the electric power steering system, and an advanced driver assistance system (ADAS) related device).

Back-up power supply system 1 according to the present embodiment includes first voltage conversion circuit 6 (voltage conversion circuit) configured to convert (boost and step down) the output voltage of electric storage device 5. Electric power is supplied to first load 31 (i.e., load 3 that permits a decrease of operating voltage) from electric storage device 5 not via first voltage conversion circuit 6. Electric power is supplied to second load 32 (i.e., load 3 that does not permit a decrease of operating voltage) from electric storage device 5 via first voltage conversion circuit 6. Since first voltage conversion circuit 6 thus converts the output voltage only for some of plural loads 3 (e.g., second load 32), the size of first voltage conversion circuit 6 can be reduced, and as a result, the cost of first voltage conversion circuit 6 can be reduced. Back-up power supply system 1 will be detailed below.

1-2. Detailed Description of Back-Up Power Supply System

As illustrated in FIG. 1, back-up power supply system 1 supplies the output power of power supply 2 to plural loads 3 when power supply 2 is not defective. Back-up power supply system 1 supplies the output power of electric storage device 5, in place of power supply 2, to plural loads 3 when power supply 2 is defective. Back-up power supply system 1 includes power feed path 4, electric storage device 5, first voltage conversion circuit 6 for back-up purposes, second voltage conversion circuit 7 for charging, bypass path 8, diode 9, first switch 10, second switch 11, selection switch 12, and control circuit 13. Electric storage device 5 may not necessarily be included in constituent elements of back-up power supply system 1.

1-2-1. Power Feed Path

Power feed path 4 is an electrical path configured to supply the output power of power supply 2 to plural loads 3 and electric storage device 5, and to supply the output power of electric storage device 5 to plural loads 3. Power feed path 4 includes first power feed path 41, second power feed path 42, third power feed path 43, and fourth power feed path 44.

First power feed path 41 is an electrical path (denoted by arrow F1 of FIG. 1) configured to supply the output power of power supply 2 to plural loads 3. First power feed path 41 includes main electrical path 41a and plural branched paths 41b. Main electrical path 41a is connected to an output port of power supply 2. Each of plural branched paths 41b corresponds to respective one of plural loads 3. Plural branched paths 41b branch at different locations of main electrical path 41a, and each of plural branched paths 41b is connected with a corresponding one of loads 3. In main electrical path 41a, first load 31 is connected upstream of second load 32 (toward power supply 2), and second load 32 is connected downstream of first load 31. In other words, first load 31 which requires a high current is connected upstream of second load 32 which does not require a high current.

Second power feed path 42 and third power feed path 43 are electrical paths configured to supply the output power of electric storage device 5 to plural loads 3.

Second power feed path 42 is an electrical path (see arrow F2 of FIG. 1) configured to supply the output power of power supply 5 to plural loads 31 not via first voltage conversion circuit 6. Second power feed path 42 connects an input/output port of electric storage device 5 to branch point N1 of first power feed path 41. Branch point N1 is disposed upstream of plural loads 3. Second power feed path 42 outputs the output power of electric storage device 5 to branch point N1 of main electrical path 41a not via first voltage conversion circuit 6. This configuration allows the output power of electric storage device 5 to be supplied to first load 31 not via first voltage conversion circuit 6. Since first load 31 permits a decrease of operating voltage, the output power of electric storage device 5 is supplied to first load 31 not via first voltage conversion circuit 6.

Third power feed path 43 is an electrical path (denoted by arrow F3 of FIG. 1) configured to supply the output power of electric storage device 5 to second load 32 via first voltage conversion circuit 6. Third power feed path 43 connects an input/output port of electric storage device 5 to branch point N2 of first power feed path 41. Branch point N2 is disposed at a location of main electrical path 41a that is between first load 31 and second load 32. That is, branch point N2 is disposed upstream of second load 32 and downstream of first load 31 in main electrical path 41a. Third power feed path 43 includes first voltage conversion circuit 6 configured to convert the output voltage of electric storage device 5. Third power feed path 43 outputs the output power of electric storage device 5 to branch point N2 of main electrical path 41a via first voltage conversion circuit 6. This configuration allows the output power of electric storage device 5 to be supplied to second load 32 via first voltage conversion circuit 6.

Fourth power feed path 44 is an electrical path (denoted by arrow F4 of FIG. 1) configured to supply the output power of power supply 2 to electric storage device 5. Fourth power feed path 44 connects a third branch point of main electrical path 41a to the input/output port of electric storage device 5. Third branch point N3 is disposed upstream of a first branch point (toward power supply 2) in main electrical path 41a. Fourth power feed path 44 includes second voltage conversion circuit 7 configured to convert the output voltage of power supply 2. Fourth power feed path 44 outputs the output power of power supply 2 to electric storage device 5 via second voltage conversion circuit 7. This configuration allows the output power of power supply 2 to charge electric storage device 5 via second voltage conversion circuit.

1-2-2. Electric Storage Device

Electric storage device 5 is a power supply for back-up (i.e., supplementary or reserve) purposes of power supply 2. In other words, electric storage device 5 is a power supply capable of supplying electric power to plural loads 3 when power supply 2 is defective. Electric storage device 5 is, for example, an electric double layer capacitor (EDLC). Electric storage device 5 may include two or more electric storage devices (e.g., electric double layer capacitors) that are electrically connected in parallel, in series, or in parallel and series to each other. In other words, electric storage device 5 may be implemented by a parallel circuit of two or more electric storage devices, a series circuit thereof, or combinations thereof.

1-2-3. Voltage Conversion Circuit

First voltage conversion circuit 6 is a constant voltage circuit configured to convert the output voltage of electric storage device 5 to a constant voltage (first voltage) to be output, and is provided in third power feed path 43, as described above. First voltage conversion circuit 6 is, for example, a boost and buck DC-DC converter. The first voltage is a voltage (e.g., 12 V) that is slightly higher than the minimum guaranteed operating voltage (e.g., 11.5 V) of second load 32. As described above, the output power of electric storage device 5 is supplied to second load 32 via first voltage conversion circuit 6. As a result, even when the output voltage of electric storage device 5 drops, the voltage output from electric storage device 5 to second load 32 is maintained at the first voltage that is higher than the minimum guaranteed operating voltage.

Second voltage conversion circuit 7 is a constant voltage circuit configured to convert (e.g., boost) the output voltage of power supply 2 to maintain the voltage at a constant voltage (second voltage, for example, 15 V) and outputs the voltage to electric storage device 5, so as to charge electric storage device 5. Second voltage conversion circuit 7 is provided in fourth power feed path 44, as described above. Second voltage conversion circuit 7 is, for example, a boost and buck DC-DC converter. Second voltage is a voltage higher than the output voltage (e.g., 12 V) of power supply 2. This configuration allows the fully charged voltage of electric storage device 5 to be higher than the output voltage of power supply 2. As a result, the output current output from electric storage device 5 to first load 31 through second power feed path 42 may be a sufficiently high current even not via first voltage conversion circuit 6.

1-2-4. Bypass Path

Bypass path 8 is an electrical path connected in parallel to first voltage conversion circuit 6, and ensures an output voltage from electric storage device 5 to second load 32 until first voltage conversion circuit 6 starts up (i.e., during the time from the commencement of the start-up to the completion of the start-up). In accordance with the embodiment, bypass path 8 includes two bypass paths (first bypass path 81 and second bypass path 82).

First bypass path 81 is an electrical path short-circuiting the input port and the output port of first voltage conversion circuit 6 on third power feed path 43. Specifically, first bypass path 81 is an electrical path that is separated from a power feed path that passes through second power feed path 42 from electric storage device 5 to first load 31. First bypass path 81 includes diode 811 configured to prevent a reverse current flow. The cathode of diode 811 is connected to an output end of first voltage conversion circuit 6, and the anode of diode 811 is connected to an input end of first voltage conversion circuit 6. Second bypass path 82 is an electrical path including second power feed path 42 and a part of first power feed path 41 between first branch point N1 and second branch point N2. In other words, second bypass path 82 is an electrical path that includes a power feed path that passes through second power feed path 42 from electric storage device 5 to first load 31.

First bypass path 81 or second bypass path 82 prevents interruption of the output voltage from electric storage device 5 to second load 32 until first voltage conversion circuit 6 starts up. In particular, first bypass path 81 is capable of supplying the output voltage from electric storage device 5 to second load 32 with no interruption until first voltage conversion circuit 6 starts up. Second bypass path 82 allows the time for which the output voltage of electric storage device 5 is interrupted to be shorter than the time (e.g., 100 msec) until first voltage conversion circuit 6 starts up while the output voltage from electric storage device 5 to second load 32 is interrupted until later-described second switch 11 is turned on (i.e., during the time (e.g., 1 msec) from the start of the turning on to the completion of the turning on). In the case that second load 32 permits a momentary power failure for a time longer than the time until second switch 11 is turned on, first bypass path 81 does not necessarily be provided.

1-2-5. Diode

Diode 9 is a diode preventing reverse current flow, and is provided in first power feed path 41 between first load 31 and second load. In accordance with the embodiment, diode 9 is provided at a position between second branch point N2 and the most downstream one of loads 3 of first load 31. The cathode of diode 9 is connected to second load 32, and the anode of diode 9 is connected to first load 31. Diode 9 prevents the current supplied from electric storage device 5 to second load 32 through third power feed path 43 or bypass paths 81, 82 from flowing back from second load 32 to first load 31 in first power feed path 41. In other words, the diode prevents the electric power supplied from electric storage device 5 to second load 32 from being taken away by first load 31.

1-2-6. Switch

First switch 10 is provided in main electrical path 41a of first power feed path 41. First switch 10 is turned on and off under the control of control circuit 13 to establish and interrupt electrical conduction of main electrical path 41a. Such establishing and interrupting of electrical conduction allows the supply of electric power from power supply 2 to plurality of loads 3 to be performed and stopped. First switch 10 is disposed, for example, between power supply 2 and third branch point N3 in main electrical path 41a. First switch 10 includes two switching elements 10a that are connected in series with each other. Each of switching elements 10a is, for example, a semiconductor switch (e.g., p-channel MOSFET: metal-oxide-semiconductor field-effect transistor).

Second switch 11 is provided in second power feed path 42 (i.e., a power feed path from electric storage device 5 to first load 31). Second switch 11 is turned on and off under the control of control circuit 13 so as to establish and interrupt electrical conduction of second power feed path 42. Such establishing and interrupting of electrical conduction allows the supply of electric power from power supply 5 to first load 31 to be performed and stopped. Second switch 11 includes two switching elements 11a that are connected in series with each other. Each of switching elements 11a is, for example, a semiconductor switch (e.g., p-channel MOSFET).

Selection switch 12 is a switch configured to select one of plural loads 3 to which electric power is to be supplied from electric storage device 5. Selection switch 12 includes plural switching elements 12a. Each of switching elements 12a is provided in branched path 41b to which a previously-designated one of plural loads 3 is connected. Each of switching elements 12a is turned on and off under the control of control circuit 13 so as to establish and interrupt electrical conduction of branched path 41b including switching elements 12a. Such establishing and interrupting of electrical conduction allows the supply of electric power from power supply 5 to the previously-designated one of loads 3 to be performed and stopped.

In accordance with the embodiment, selection switch 12 is configured to select one(s) of plural loads 3 to which electric power is not to be supplied by being turned off under control of switching elements 12a. This selection allows the remaining one(s) of plural loads 3 to be selected as one(s) of plural loads 3 to which electric power is supplied from electric storage device 5.

The designated load 3 includes, for example, the electric steering device and the ECU (electronic control unit) thereof as well as the ECU of the brake device, but it does not include the brake device or ADAS (advanced driver-assistance system) related devices.

In accordance with the embodiment, selection switch 12 is controlled in the following manner, for example. When power supply 2 is not defective, all of switching elements 12a are controlled to be turned on. This allows all the foregoing designated ones of loads 3 to be supplied with electric power from power supply 2. When vehicle 9 is in automated driving while power supply 2 is defective, all of switching elements 12a are controlled to be turned on. This configuration allows all the foregoing designated ones of loads 3 to be supplied with electric power from electric storage device 5. As a result, when vehicle 9 is in automated driving while power supply 2 is defective, all of loads 3 related to automated driving are supplied with electric power from electric storage device 5. On the other hand, when vehicle 9 is not in automated driving while power supply 2 is defective, all of switching elements 12a are controlled to be turned off. This configuration stops the supply of electric power from electric storage device 5 to all the foregoing designated ones of loads 3. As a result, for example, electric power from electric storage device 5 is supplied to the loads that are related to braking of vehicle 9 and also utilizes the power of the driver (e.g., the brake device). On the other hand, electric power from electric storage device 5 is not supplied to the loads that are neither related to braking of vehicle 9 nor utilize the power of the driver (e.g., the electric steering device and the ECU thereof as well as the ECU of the brake device).

1-2-7. Control Circuit

Control circuit 13 is configured to monitor the output voltage of power supply 2, for example, so as to determine whether or not power supply 2 is defective. Control circuit 13 is further configured to control first voltage conversion circuit 6, second voltage conversion circuit 7, first switch 10, second switch 11, and selection switch 12 according to whether or not power supply 2 is defective. The details of the operations of control circuit 13 will be described in the later-described description of operations.

Control circuit 13 is composed of, for example, a microcomputer including a processor and a memory. In other words, control circuit 13 is implemented by a computer system including a processor and a memory. The processor executes appropriate programs to thereby cause the computer system to function as control circuit 13. The programs may be pre-stored in the memory or may be recorded and provided in non-volatile recording media such as memory cards via telecommunication lines such as the Internet.

1-3. Description of Operations

A main operations of back-up power supply system 1 will be described with reference to FIGS. 1, 3, and 4.

As illustrated in FIG. 1, when power supply 2 is not defective, control circuit 13 turns on first switch 10 (specifically, two switching elements 10a) and turns off second switch 11 (specifically, two switching elements) so as to stop first voltage conversion circuit 6. As a result, the output power of power supply 2 is supplied via first power feed path 41 (i.e., main electrical path 41 and plural branched paths 41b) to plural loads 3 (i.e., first load 31 and second load 32).

In addition, when power supply 2 is not defective, control circuit 13 activates second voltage conversion circuit 7. As a result, the output power of power supply 2 is supplied from third the branch point of first power feed path 41 through fourth power feed path 44 (i.e., via through second voltage conversion circuit 7) to electric storage device 5. As a result, electric storage device 5 is charged. This charging causes the voltage of electric storage device 5 in a fully charged state to be higher than the output voltage of power supply 2.

On the other hand, when power supply 2 is defective, control circuit 13 stops second voltage conversion circuit 7. This configuration stops charging of electric storage device 5 by second voltage conversion circuit 7.

Also when power supply 2 is defective, control circuit 13 turns off first switch 10 (specifically, two switching elements 10a) and turns on second switch 11 (specifically, two switching elements 11a) so as to activate (i.e., to start) first voltage conversion circuit 6. This configuration allows the output power of electric storage device 5 to be output through second power feed path 42 to first branch point N1 of first power feed path 41 and supplied through first power feed path 41 to plural loads 3 (particularly to first load 31). At this moment, since the fully charged voltage of electric storage device 5 is higher than the output voltage of power supply 2, a sufficiently high operating current is supplied to first load 31 (i.e., of power systems) without boosting the output voltage of electric storage device 5.

Simultaneously to this supplying, the output power of electric storage device 5 is output through third power feed path 43 to second branch point N2 of first power feed path 41, to be supplied to second load 32 through first power feed path 41. At this moment, the output power of electric storage device 5 that passes through third power feed path 43 passes through first bypass path 81 (i.e., not via first voltage conversion circuit 6) to be output to second branch point N2 until first voltage conversion circuit 6 starts up (i.e., during the time (for example, 100 msec) from the start-up to the completion of the start-up). That is, until first voltage conversion circuit 6 starts up, the output voltage of first voltage conversion circuit 6 is not boosted sufficiently and is lower than the output voltage of electric storage device 5, so that the output voltage of electric storage device 5 is output to second branch point N2 via first bypass path 81.

Thus, until first voltage conversion circuit 6 starts up, the output power of electric storage device 5 is not converted (i.e., boosted) by first voltage conversion circuit 6. However, since the fully charged voltage of electric storage device 5 is higher than the output voltage of power supply 2, the output voltage of electric storage device 5 that is output to second branch point N2 is maintained to be higher than or equal to the minimum guaranteed operating voltage of second load 32. This configuration prevents interruption of the output voltage from electric storage device 5 to second load 32 until first voltage conversion circuit 6 starts up.

In accordance with the embodiment, second power feed path 42 and a part of first power feed path 41 between first branch point N1 and second branch point N2 together constitute second bypass path 82. Until first voltage conversion circuit 6 starts up, the output voltage of first voltage conversion circuit 6 is also output to first branch point N1 through second bypass path 82. Accordingly, this second bypass path 82 prevents interruption of the output voltage from electric storage device 5 to second load 32 until first voltage conversion circuit 6 starts up.

Then, after the start-up of first voltage conversion circuit 6 (i.e., after the completion of the start-up), the output power of electric storage device 5 that passes through third power feed path 43 is output to second branch point N2 via first voltage conversion circuit 6. That is, after the start-up of first voltage conversion circuit 6, the output voltage of first voltage conversion circuit 6 is boosted sufficiently to be higher than the output voltage of electric storage device 5, so that the output voltage of electric storage device 5 does not pass first bypass path 81 but is boosted by first voltage conversion circuit 6 and output to second branch point N2.

Thus, after the start-up of first voltage conversion circuit 6, the output voltage of electric storage device 5 passes through first voltage conversion circuit 6. Therefore, even if the output voltage of electric storage device 5 drops, the output voltage of electric storage device 5 is boosted by first voltage conversion circuit 6 and is maintained to be a constant voltage that is higher than or equal to the minimum guaranteed operating voltage of second load 32.

In addition, when electric power is supplied from electric storage device 5 to second load 32 through third power feed path 43 or bypass paths 81 and 82, diode 9 prevents the electric power supplied to second load 32 from flowing back to first power feed path 41 and being taken away by first load 31.

In accordance with the embodiment, the electric power required for operating the one(s) of loads 3 selected by selection switch 12 is supplied continuously for a certain time (e.g., 7 seconds) after power supply 2 is defective. More specifically, an operating current higher than or equal to a certain current value (e.g., an operating current of higher than or equal to 16 A) is supplied to first load 31, and a constant voltage (e.g., 12 V) that is higher than or equal to minimum guaranteed operating voltage Vt (e.g., 11.5 V) is supplied to second load 32. FIG. 3 shows an example of changes over time of voltage V1 and current I1 that are output from electric storage device 5 to first load 31 through second power feed path 42 when power supply 2 is defective. In FIG. 3, the reference character Vs represents the minimum guaranteed operating voltage (e.g., 9.5 V) of first load 31. FIG. 4 shows an example of changes over time of voltage V2 and current I2 that are output from electric storage device 5 to second load 32 through third power feed path 43 when power supply 2 is defective. In FIG. 4, the reference character Vt represents the minimum guaranteed operating voltage (e.g., 11.5 V) of first load 31. In FIGS. 3 and 4, the time at which power supply 2 becomes defective is defined as time t=0.

Figure 3:
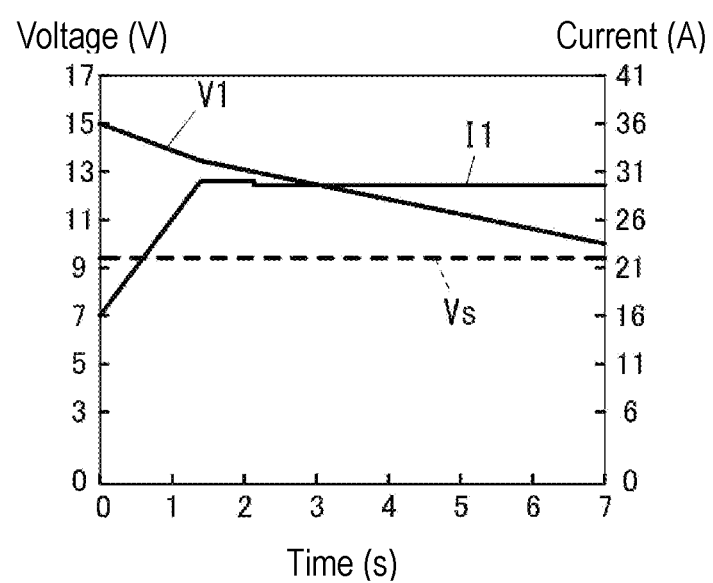
FIG. 3 shows an example of changes time of the voltage and current output from an electric storage device to a first load when a failure occurs in a power supply.
Figure 4:
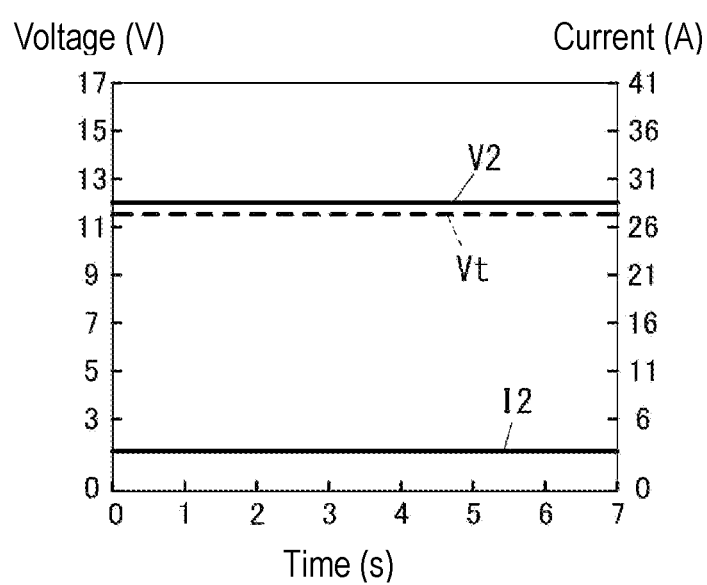
FIG. 4 shows an example of changes over time of the voltage and current output from the electric storage device to a second load when a failure occurs in the power supply.

As illustrated in FIG. 3, current I1 increases from 16 A to 30 A and is maintained at a constant value of 30 A, for a certain time (e.g., 7 seconds). In other words, current I1 is maintained for a certain time at a current higher than or equal to 16 A, which is required for the operation of first load 31. Voltage V1 gradually decreases from 15 V over time but remains at a voltage higher than or equal to minimum guaranteed operating voltage Vs of first load 31 for a certain time (e.g., 7 seconds). As illustrated in FIG. 4, current I2 remains at a current (e.g., 2.5 A) that is required for the operation of second load 32 for a certain time (e.g., 7 seconds). Voltage V2 remains at a voltage (e.g., 12 V) higher than or equal to minimum guaranteed operating voltage Vt of second load 32 for a certain time (e.g., 7 seconds).

Thus, for a certain time (e.g., 7 seconds) from the time when power supply 2 becomes defective, an operating current that is necessary for first load 31 to operate is continuously supplied to first load 31, and a constant voltage higher than or equal to minimum guaranteed operating voltage Vt is continuously supplied to second load 32. The above-mentioned certain time is the time that is required for vehicle 9 traveling at a predetermined speed (e.g., 60 km/h) to stop stably. Thus, when power supply 2 is defective while vehicle 9 travels at a predetermined speed, vehicle 9 can stop stably.

1-4. Main Advantageous Effect

As described above, back-up power supply system 1 according to the present embodiment is a system configured to supply electric power from electric storage device 5 to plural loads 5 when power supply 2 is defective. Back-up power supply system 1 includes first voltage conversion circuit 6. First voltage conversion circuit 6 is configured to convert the output voltage of electric storage device 5. Plural of loads 3 include first load 31 and second load 32. Electric power is supplied from electric storage device 5 to first load 31 not via first voltage conversion circuit 6. Electric power is supplied from electric storage device 5 to second load 32 via first voltage conversion circuit 6. This configuration reduces the size of first voltage conversion circuit 6 in comparison with the case where first voltage conversion circuit 6 performs voltage conversion for plural loads 3 since first voltage conversion circuit 6 performs voltage conversion only for some of plural loads 3 (second load 32). As a result, the cost of first voltage conversion circuit can be reduced.

2. Modified Example

Modified examples of the foregoing exemplary embodiment will be described below. The modified examples described below may be combined as appropriate. In the modified examples described below, the description will be focused on matters that are different from the exemplary embodiment, and the same or similar parts to those of the exemplary embodiment are designated by same reference signs, which may not be further described.

2-1. Modified Example 1

In the foregoing embodiment, electric storage device 5 may be a secondary battery, such as lithium ion capacitor (LIC) or lithium ion battery (LIB). In a lithium ion capacitor, the positive electrode is made of material similar to that of EDLC (such as activated carbon), and the negative electrode is made of material similar to that of LIB (e.g., carbon material such as graphite).

Electric storage device 5 is not limited to an electric double layer capacitor, but may be, for example, an electrochemical device that has a structure as described below. The electrochemical device referred to herein includes a positive electrode, a negative electrode, and a non-aqueous electrolyte. The positive electrode includes a positive electrode current collector and a positive electrode material layer supported by the positive electrode current collector and containing a positive electrode active material. The positive electrode material layer contains conductive polymer as positive electrode active material that dopes and de-dopes anions (dopant). The negative electrode includes a negative electrode material layer containing negative electrode active material. An example of the negative electrode active material is a substance that undergoes oxidation-reduction reaction accompanying absorption and release of lithium ions. Specific examples include carbon materials, metallic compounds, alloys, ceramic materials, and the like. The non-aqueous electrolyte exhibits lithium-ion conductivity, for example. This type of non-aqueous electrolyte contains lithium salt and non-aqueous solution in which the lithium salt is dissolved. The electrochemical device with such a configuration has a higher energy density than electric double layer capacitors and the like.

2-2. Modified Example 2

Figure 5:
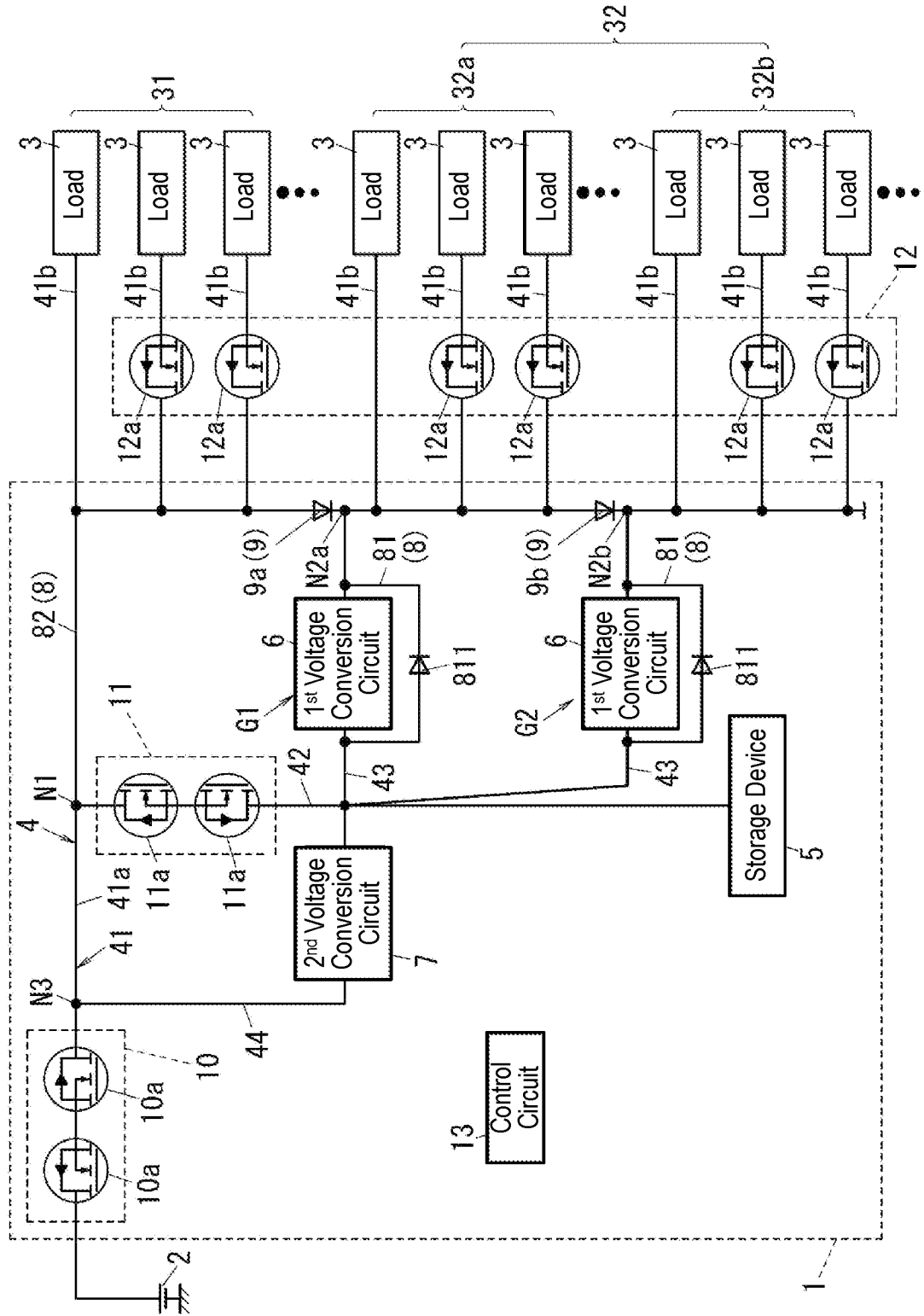
FIG. 5 is a block diagram of a back-up power supply system in accordance with a modified example 2.

The system according to foregoing exemplary embodiment includes only one first voltage conversion circuit 6. However, as illustrated in FIG. 5, the system may include plural first voltage conversion circuits 6. In the foregoing exemplary embodiment, first voltage conversion circuit 6, third power feed path 43, diode 9, first bypass path 81, and diode 811 constitute one set. Accordingly, the modified example includes plural above-described sets. Also in the present modified example, second load 32 includes plural load groups respectively corresponding to plural first voltage conversion circuits 6. The load groups have minimum guaranteed operating voltages that are different from one another.

The example shown in FIG. 5 includes two first voltage conversion circuits 6, in other words, two of above-described sets are provided. In this case, the plural load groups are two load groups. The two load groups are respectively referred to as load group 32a and load group 32b. Also, the two above-described sets are respectively referred to as set G1 and set G2.

Each of third power feed paths 43 of sets G1 and G2 is connected between the input/output section of electric storage device 5 and two branch points N2a and N2b of first power feed path 41. Branch point N2a is a branch point located between first load 31 and load group 32a in first power feed path 41. Branch point N2b is a branch point located between two load groups 32a and 32b in first power feed path 41. Diode 9 of set G1 is disposed between first load 31 and branch point N2a in main electrical path 41a of first power feed path 41. Diode 9 of set G2 is disposed between load group 32a and branch point N2a in main electrical path 41a of first power feed path 41. First voltage conversion circuits 6 of sets G1 and G2 respectively correspond to two load groups 32a and 32b. Each of first voltage conversion circuits 6 converts the output voltage of electric storage device 5 to a constant voltage higher than or equal to the minimum guaranteed operating voltage of the corresponding load group, and outputs the voltage to the corresponding load group.

In the modified example, plural first voltage conversion circuits 6 further reduces the size of each of first voltage conversion circuits 6, and reduces the overall size of plural first voltage conversion circuits 6. As a result, the cost of first voltage conversion circuits 6 can be further reduced.

2-3. Other Modified Examples

In the foregoing exemplary embodiment, diode 9, is provided in first bypass path 81, but a series regulator may be provided in place of diode 9.

In the foregoing embodiment, each of first load 31 and second load 32 includes plural loads (load groups), but each of first load 31 and second load 32 may be one load. At least one of first load 31 and second load 32 may be a load group including plural loads.

In accordance with the foregoing embodiment, first load 31 satisfies both the first condition and the second condition with respect to second load 32, but at least one of the first condition and the second condition may be satisfied. The first condition is a condition in which the power consumption is higher (i.e., the operating current is higher), and the second condition is a condition in which the minimum guaranteed operating voltage is lower.

3. Conclusion

In view of the foregoing exemplary embodiments and modified examples, the present disclosure includes the following aspects.

A back-up power supply system (1) according to a first aspect is configured to supply electric power from an electric storage device (5) to plural loads (3) when the power supply (2) is defective. The back-up power supply system (1) includes a first voltage conversion circuit (6) configured to convert an output voltage of the electric storage device (5). The plural loads (3) include a first load (31) and a second load (32). The back-up power supply system (1) is configured to supply electric power from the electric storage device (5) to the first load (31) not via the voltage conversion circuit (6), and to supply electric power from the electric storage device (5) to the second load (32) via the voltage conversion circuit (6).

In this configuration, since the first voltage conversion circuit (6) performs voltage conversion only for some of the plural loads (3) (second load (32)), the size of the first voltage conversion circuit (6) can be reduced, and as a result, the cost of the first voltage conversion circuit (6) can be reduced.

In a back-up power supply system (1) according to a second aspect, in the first aspect, the first load (31) satisfies at least one of a first condition in which the first load (31) has a higher power consumption than the second load (32) and a second condition in which the first load (31) that has a lower minimum guaranteed operating voltage than the second load (32).

In this configuration, electric power from electric storage device (5) can be supplied to one(s) of the plural loads (3) that satisfies at least one of the first and second conditions not via the voltage conversion circuit (6).

A back-up power supply system (1) according to a third aspect further includes, in the first or second aspect, a bypass path (8) connected in parallel to the voltage conversion circuit (6).

This configuration prevents interruption of the output voltage from the electric storage device (5) to the second load (32) until the first voltage conversion circuit (6) starts up (i.e., during the time from the start-up to the completion of the start-up).

In a back-up power supply system (1) according to a fourth aspect, in the third aspect, the bypass path (8) includes a first bypass path (81) separated from a power feed path from the electric storage device (5) to the first load (31).

In this configuration, even when the power feed path from the electric storage device (5) to the first load (31) includes a circuit (e.g., a switch or the like) in which the voltage may be momentarily stopped, the bypass path (8) reduces the adverse effects caused by the momentary stop.

In a back-up power supply system (1) according to a fifth aspect, in the third or fourth aspect, the bypass path (8)

includes a second bypass path (82) including the power feed path from electric storage device (5) to first load (31).

With this configuration, the bypass path (8) may be constructed using a power feed path from electric storage device (5) to first load (31) (i.e., using an existing power feed path).

In a back-up power supply system (1) according to a sixth aspect, in any one of the third to fifth aspects, the bypass path (8) includes a diode (811)

This configuration prevents a reverse flow of electric current in the bypass path (8).

A back-up power supply system (1) according to a seventh aspect further includes, in any one of the third to fifth aspects, a charging circuit (7) configured to charge electric storage device (5).

With this configuration, charging circuit (7) can control the voltage (charge voltage) of the electric storage device (5) during charge, and as a result, can control the fully charged voltage of the electric storage device (5).

A back-up power supply system (1) according to an eighth aspect further includes, in any one of the first to seventh aspects, switch (11) that establishes and interrupts electrical conduction of the power feed path from the electric storage device (5) to the first load (31).

This configuration enables the switch (11) to selectively switch between supply and interruption of electric power from the electric storage device (5) to the first load (31).

In a back-up power supply system (1) according to a ninth aspect, in any one of the first to eighth aspects, at least one of the first load (31) and the second load (32) includes a load group including plural loads (3). The back-up power supply system (1) further includes a selection switch (12) configured to select a load among the plural loads of the load group to which electric power is to be supplied from the electric storage device (5).

This configuration enables the switch (12) to selectively switch between supply and interruption of electric power from the electric storage device (5) to the first load (5).

In a back-up power supply system (1) according to a tenth aspect, in any one of the first to ninth aspects, the electric storage device (5) is a capacitor.

With this configuration, it is possible to use a capacitor-type electric storage device (e.g., an electric double layer capacitor) as electric storage device (5).

In a back-up power supply system (1) according to an eleventh aspect, in any one of the first to tenth aspects, the electric storage device (5) is charged by power supply (2). The fully charged voltage of the electric storage device (5) is higher than the output voltage of the power supply (2).

With this configuration, a sufficiently high current can be supplied from the electric storage device (5) to the first load (31) even not via the first voltage conversion circuit (6).

A back-up power supply system (1) according to a twelfth aspect further includes, in any one of the first to eleventh aspects, the electric storage device (5).

This configuration provides the back-up power supply system (1) in an embodiment including the electric storage device (5).

According to a thirteenth aspect, a movable body (9) includes the back-up power supply system (1) according to the twelfth aspect and a movable-body main unit.

This configuration provides the movable body (9) including the above-described back-up power supply system (1).

REFERENCE MARKS IN THE DRAWINGS 1 back-up power supply system
2 power supply
3 load
5 electric storage device
6 first voltage conversion circuit (voltage conversion circuit)
7 second voltage conversion circuit (charging circuit)
8 bypass path
11 second switch (switch)
12 selection switch
31 first load
32 second load
81 first bypass path
82 second bypass path

The invention claimed is:

1. A back-up power supply system configured to supply electric power from an electric storage device to a plurality of loads when a power supply is defective, the back-up power supply system comprising:
a voltage conversion circuit configured to convert an output voltage of the electric storage device, wherein
the plurality of loads include a first load and a second load,
the back-up power supply system is configured to supply electric power from the power supply to the first load and the second load not via the voltage conversion circuit when the power supply is not defective,
the back-up power supply system is configured to supply electric power from the electric storage device to the first load not via the voltage conversion circuit when the power supply is defective, and
the back-up power supply system is configured to supply electric power from the electric storage device to the second load via the voltage conversion circuit.

2. The back-up power supply system according to claim 1, wherein the first load satisfies at least one of: a first condition in which the first load has a higher power consumption than the second load; and a second condition in which the first load is a lower minimum guaranteed operating voltage than the second load.

3. The back-up power supply system according to claim 1, further comprising a bypass path connected in parallel to the voltage conversion circuit.

4. The back-up power supply system according to claim 3, wherein the bypass path includes a first bypass path separated from a power feed path to the first load from the electric storage device.

5. The back-up power supply system according to claim 3, wherein the bypass path includes a second bypass path including a power feed path to the first load from the electric storage device.

6. The back-up power supply system according to claim 3, wherein the bypass path includes a diode.

7. The back-up power supply system according to claim 3, further comprising a charging circuit configured to charge the electric storage device.

8. The back-up power supply system according to claim 1, further comprising a switch configured to establish and interrupt electrical conduction of a power feed path to the first load from the electric storage device.

9. The back-up power supply system according to claim 1, wherein
at least one of the first load and the second load includes a load group including a plurality of loads, and
the back-up power supply system further comprises a selection switch configured to select, among the plurality of loads of the load group, a load to which the electric power is to be supplied from the electric storage device.

10. The back-up power supply system according to claim 1, wherein the electric storage device is a capacitor.

11. The back-up power supply system according to claim 1, wherein
the electric storage device is configured to be charged by the power supply, and
a fully charged voltage of the electric storage device is higher than an output voltage of the power supply.

12. The back-up power supply system according to claim 1, further comprising the electric storage device.

13. A movable body comprising:
the back-up power supply system according to claim 12; and
a movable-body main unit.

14. The back-up power supply system according to claim 8, wherein the back-up power supply system is configured to supply electric power from the electric storage device to the first load via the switch and not via the voltage conversion circuit when the power supply is defective.

* * * * *